May 20, 1930.    B. HOFSETH    1,759,456
PROCESS OF EXTRACTING USEFUL ELEMENTS FROM
THEIR ORES BY THE AID OF GASES
Filed Aug. 25, 1927

Inventor
Bjarne Hofseth

Patented May 20, 1930

1,759,456

UNITED STATES PATENT OFFICE

BJARNE HOFSETH, OF LEIRBOTN, NORWAY

PROCESS OF EXTRACTING USEFUL ELEMENTS FROM THEIR ORES BY THE AID OF GASES

Application filed August 25, 1927, Serial No. 215,508, and in Norway September 10, 1926.

The process has for its object to extract the useful constituents of an orebody in a considerably purer form than is possible by mining, and also more cheaply.

The orebody is made accessible by openings from the surface, similar to those which would be made in preparations for mining. Through these openings the gases employed are brought in and the products taken out. There also must be provided within the orebody, and well protected against communication with the atmosphere, one passageway for gases going in and one for gases coming out.

Several types of ore may be worked by this process by suitable choice of ingoing gases and suitable treatment of outcoming gases or products.

*Example 1.*—A method to work a deposit of iron oxide ore carrying 35 to 40 percent of iron, with mainly quartz and some hornblende as gangue minerals. Practically no lime present.

*Example 2.*—A method to work a deposit of iron pyrites carrying about 40% sulphur. The orebody is a fairly big vein with very little lime present.

Figure 1:
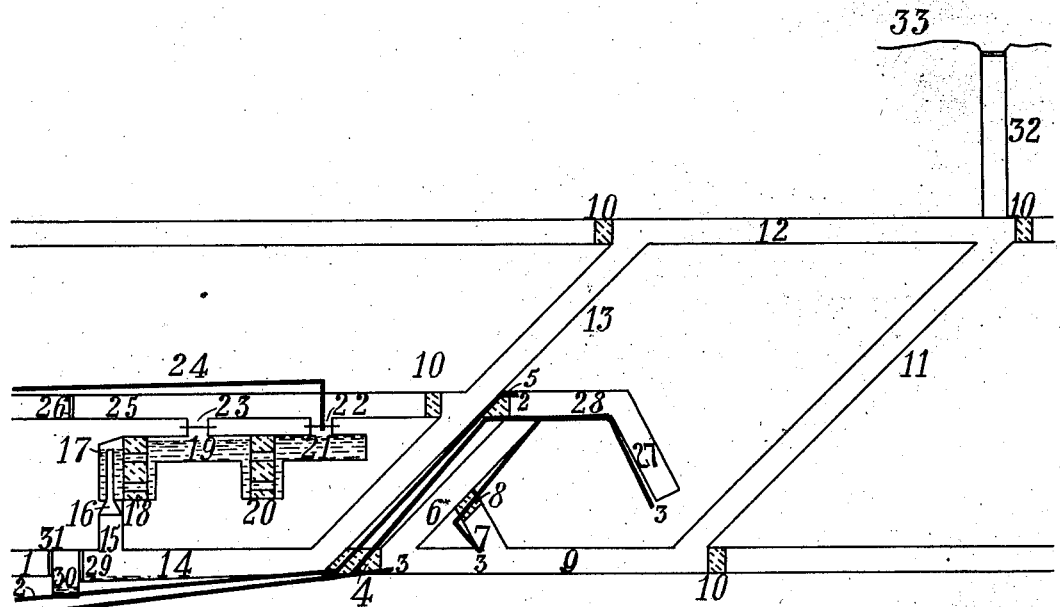

Fig. 1 on the drawing, accompanying this specification, illustrates Example 1. It is a longitudinal vertical section of the orebody as prepared for my process.

Figure 2:
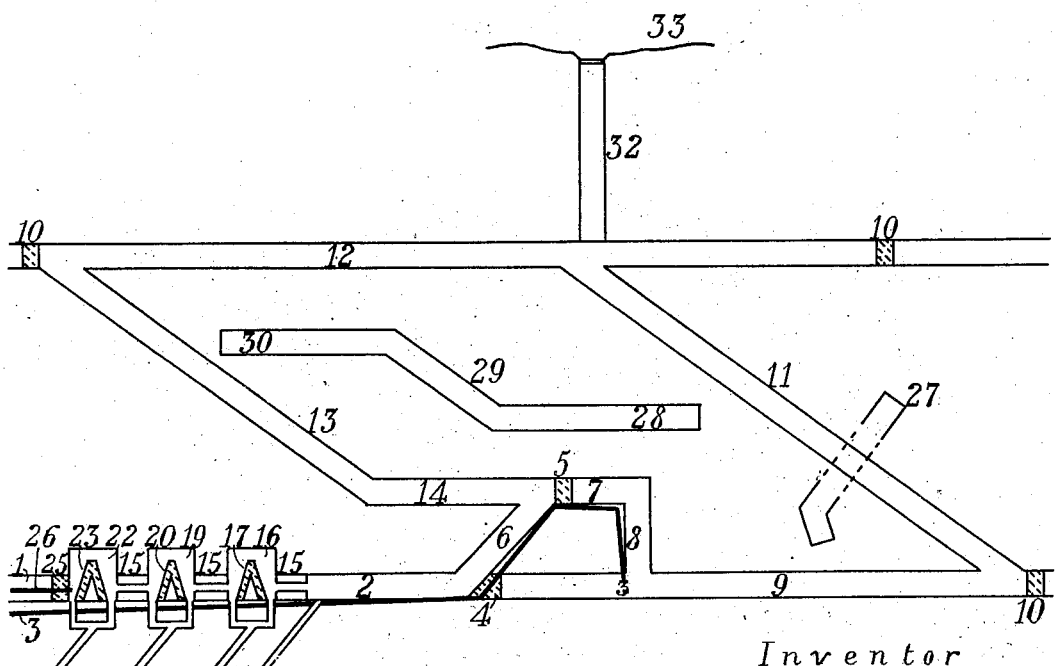

Fig. 2 in a similar manner illustrates Example 2.

In Fig. 1 1 represents a horizontal tunnel. Along the bottom of this two ditches are cut out in which are placed acidproof pipes 2 and 3. Pipe 2 is intended for hydrogen and pipe 3 for chlorine gas. 4 is a bulkhead made from siliceous rock, intended to separate the ingoing gas in 9 from the outcoming gas in 13. In bulkhead 4 the chlorine pipe 3 is split in two branches. One branch opens directly into 9, the other branch reaches 9 through a passage which will keep open after 9 has been filled with gangue to such extent as to prevent the chlorine from 4 to reach 11.

From 4 the pipes 2 and a branch of 3 pass up the raise 13 in ditches along the bottom until the bulkhead 5 is reached, which is similar to 4 and with a similar purpose. Pipe 3 goes through this bulkhead and continues till it reaches 9. Pipe 2 ends in 5 and discharges its contents of hydrogen into the raise 6. Pipe 3 sends a branch down 6, placed in a similar manner as in 13, and this branch goes into the raise 7 through bulkhead 8, the purpose of which is to prevent chlorine from discharging into 6.

In tunnel 9 the chlorine unites with the hydrogen and attacks the orebody above, and along the sides of 9 and 11, which have been brought to a temperature of 350 to 500 degrees centigrade during a previous heating.

The reactions between hydrogen and chlorine and iron oxide give as their products ferrichloride and water, both gaseous at this temperature. Some ferrochloride, which at this temperature is solid, is formed, but is immediately attacked by the excess of chlorine supplied for this purpose, and transformed into gaseous ferrichloride.

Impurities and gangue minerals in the ore are left in situ, but as the iron oxide is decomposed and volatilized the gangue is gradually loosened until it drops down.

The reaction going on in 9 and 11 are strongly exothermic and transform the orebody into a selfgoing furnace.

In dry rock, high grade ore, and efficient treatment of products, the temperature may rise too high in 9 and 11 and tend to cause a loss of iron as ferrochloride buried in the gangue. To remedy this, water may be run in through the shaft 32 from the surface 33.

In low grade ore or very wet rock the temperature may drop too low, and a crust of solid ferrichloride may form in 12 and 13. In that case additional heat may be supplied by bringing in a well balanced supply of fuel and oxygen, either through pipes 2 and 3, or shafts 32.

During operation gaseous ferrichloride and water are produced, mainly in 9 and 11 where a furnace chamber is gradually developing. Together with unconsumed hydrogen chloride and a slight excess of chlorine this gas current is escaping through 12 and 13 into 14, being deflected by the bulkheads 10. The basin 14 holds a solution of ferrichloride. As the hot gas current from the furnace chamber passes over here the water in the solution evaporates, taking the necessary heat from the gas current, which cools down. The ferrichloride condenses, part goes into the solution in 14 and some follows the gas current, now mainly steam, up through 15 and 16 into 17. 15 is a shaft or raise in rock or ore. 17 is a pit surrounding the acid proof chimney 16 and lined against the rock, if this is not acid resisting. This pit is filled with ferrichloride solution.

From the rising steam some heat is conducted through the chimney walls to the liquid in 17 and ultimately the steam is condensed against the sloping roof, against which it is deflected and drips down into the liquid.

From 17 heat and acid are transferred into the liquid in the basin 19 by means of circulation of the liquid through the two holes shown in the wall 18, which is made from siliceous rock.

The liquid in 19 dissolves ore, either from the sides and bottom of the basin itself, or from ore dumped into the basin. For communication there is provided the airtight door 26, the tunnel 25 and the opening 23. 26 and 23 are generally kept closed.

The purpose of basins 19 and 21 is chiefly to catch escaping ferrichloride, but also to catch acid and chlorine in escaping gases, to utilize heat, and to treat ores which cannot be treated in the furnace chambers. The products from these basins are a solution of a ferrichloride and a supply of fairly pure steam to be utilized for regeneration of hydrogen. From 19 the liquid circulates into 21 through the holes in wall 20. Steam passes from 21 to the hydrogen plant through the pipe 24, through hole 22. The pressure in 24 must be kept lower than that in pipes 2 and 3 as the operation of the process depends on this difference in pressure.

At intervals the solution in 14 is run by gravity through the door 29 into the pit 30. Then the pressure in 2 and 3 is lowered and 24 is connected to the hydrogen plant gasometer, not shown in the drawing. Conditions of pressure being thus reversed the liquid from 21 is partly driven into 19, while from 19 liquid goes into 17 and overflows down 16, again filling up 14. Then the regular conditions of pressure are reestablished and work goes on after practically no interruption.

The liquid in 30 is cooled down to about 75 degrees C., thus dropping most of its content of ferrichloride, whereupon the residual solution is pumped back into 14 and the crystals of ferrichloride are taken out from 30 to be utilized.

The door 31 serves as a protection against air for the solution in pit 30 and as an additional safety against air for 14 and the whole system.

As the furnace chamber grows during work, the corner between 9 and 11 is eaten away, and gangue accumulates here. At a certain stage of the development the pit 27 is cut open by the growing furnace chamber, opening at the same time the branch of pipe 3 into this pit. There will thus come a supply of chlorine to this corner, through 3, and as hydrogen is filling 28 and 27 the main reactions will now locate here, but still with some action along 9. Finally, when 9 has been closed by accumulation of gangue, 28 will replace it during work on last part of block.

In Fig. 2 1 represents a tunnel along the bottom of which is placed, as explained under Fig. 1, a pipe 3 which passes by the coolers into 2, a continuation of 1, but slightly sloping outwardly; up raise 6 into tunnel 7 and down pit 8, at the bottom of which it discharges its content of chlorine into tunnel 9. 4 and 5 are bulkheads similar to 4 and 5 in Fig. 1.

The ore around 9 and around the raise 11 has been preheated to a temperature between 850 and 1000 degrees C. in a similar manner as in Example 1, for the first step, that is, by combustion of fuel in the tunnels 9 in Fig. 1, or in Fig. 2, bringing in air through a pipe and taking out the smoke through another pipe. This preheating goes on for months, until the rocks have been preheated to a sufficient depth to prevent undue leakage of heat. After a temperature of about 570 deg. C. has been reached in Example 2, sulphur, escaping from the ore, is used for fuel.

When chlorine is discharged into the preheated openings it attacks the ore, forming ferrochloride, and setting free the sulphur, both of which are gaseous at this temperature. Some water escapes from moisture in the rock. Gangue remains unaltered and drops down.

The reactions are exothermic, but unless the ore is favourable the losses are great enough to cause falling of temperature. To remedy such cooling one should either stop blowing in chlorine as soon as liquid ferrochloride shows in the pipe 31, and blow in oxygen to reheat the system, or continue until the temperature in 64 threatens freezing and then leave the system to cool down for a few months while working in another block until 350 to 400 deg. C. is reached. Then the blowing in of chlorine is resumed, which at this temperature cleans up by transforming the ferrochloride into ferrichloride, and brings it out as a gas which is condensed and utilized. After this cleaning oxygen is blown in to reheat. As a crust of iron oxide is formed in the furnace chamber during oxygen blowing, there has to be blown in some hydrogen chloride after each reheating.

In Fig. 2 the direction of the raises 11 and 13 is such that a small amount of gangue would be able to block the passage for the gases at the corners from 9 to 11 and from 13 to 2. Therefore the slope of 11 and 13 is made so as to prevent gangue from sliding down, and as an additional safety the tunnel 14 is made.

The gas ordinarily going out from the furnace chamber contains ferrochloride, sulphur, unconsumed chlorine and some water. After passing 12, 13, 14, 6 and 2 it reaches a set of coolers, 15, to be gradually cooled down there. 16 is made from acidproof material, e. g. special glass, in which water circulates. After passing through the first cooler the gas current goes into a chamber 16 where it hits against a watercooled baffle wall 17. Here it slows down and is cooled to 550–700 deg. C., dropping its content of ferrochloride as a liquid, which runs down into the pipe 18 and is carried away to be utilized.

From 16 the gas current again goes through 15, and into chamber 19 against the baffle wall 20. Under a temperature here of 250–400 deg. C. the sulphur is dropped as a liquid, which goes out pipe 21 to be utilized.

In the next chamber, 22, with baffle wall 23, a temperature as near as possible to boiling point of water is maintained in order to avoid loss of chlorine. Water is condensed and runs out pipe 24, leaving the chlorine free. This goes through the acidproof wall 25 and pipe 26 to the chlorine supply.

The bulkheads 10 are made from siliceous rock and serve to deflect the gas current.

In 13, 14, 6 and 2 some liquid ferrochloride collects when the system is running low in temperature. By making all these drifts sloping outwards the liquid gradually collects near the cooler 15. Being contaminated with gangue it is run out through a separate pipe 31 to be utilized.

The openings 27, 28, 29 and 30 have been made with access from the country rock through cross cuts, not shown. They serve to give passage for the gases when part of the ore body has been eaten away, and accumulated gangue might otherwise block the passage.

Some ore from elsewhere may be dumped down shaft 32 from the surface 33, to be utilized.

This process is also adaptable for treatment of other ores than mentioned in Examples 1 and 2, e. g. for titaniferous iron ore, for production of iron and titanium; and for argentiferous galena with zincblende and pyrrhotite, for production of sulphur, iron, lead, zinc and silver.

In this latter case it may be of advantage to partly replace chlorine by other gases, e. g. iodine.

I claim:

1. The process of extracting metals and other useful elements in metallic minerals from the ore, without mining the ore, by bringing suitable gases to act upon heated surfaces within the orebody under such conditions that thereby the useful elements in the metallic minerals present in the orebody are transferred into some volatile product which after suitable treatment may be utilized.

2. The process of extracting metals from their ores in non-porous orebodies, in situ, by forming with the aid of artificial means accessible surfaces inside the orebody, preheating these surfaces and afterwards bringing a suitable gas to play upon said heated surfaces, thereby transferring the metal in the orebody into some volatile product which after suitable treatment is utilized.

3. The process to utilize by the aid of gases and without mining the ore the content of metallic minerals in an orebody by first opening up the orebody in a similar manner as by ordinary preparation for mining that orebody, and afterwards preheating the rock surrounding said openings to a temperature suitable for the formation of volatile products of the contained minerals to be utilized, which products are created by reactions with suitable gases brought into said openings, and which products leave in a gas the spot where they are created.

BJARNE HOFSETH.